(12) United States Patent
Gan Chowdhury et al.

(10) Patent No.: US 9,951,752 B2
(45) Date of Patent: Apr. 24, 2018

(54) ACTIVE AERODYNAMICS MITIGATION AND POWER PRODUCTION SYSTEM FOR BUILDINGS AND OTHER STRUCTURES

(71) Applicants: Arindam Gan Chowdhury, Miami, FL (US); Andres Tremante, Miami, FL (US)

(72) Inventors: Arindam Gan Chowdhury, Miami, FL (US); Andres Tremante, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 67 days.

(21) Appl. No.: 14/725,055

(22) Filed: May 29, 2015

(65) Prior Publication Data

US 2015/0345472 A1 Dec. 3, 2015

Related U.S. Application Data

(60) Provisional application No. 62/004,434, filed on May 29, 2014.

(51) Int. Cl.
*F03D 9/00* (2016.01)
*F03D 3/00* (2006.01)
(Continued)

(52) U.S. Cl.
CPC ............ *F03D 9/002* (2013.01); *F03D 3/002* (2013.01); *F03D 3/064* (2013.01); *F03D 9/25* (2016.05);
(Continued)

(58) Field of Classification Search
CPC .................................. F03D 9/00; E04H 9/14
(Continued)

(56) References Cited

U.S. PATENT DOCUMENTS 893,052 A * 7/1908 Carlson ................. F03D 7/0212
188/155
4,086,026 A * 4/1978 Tamanini ................. F03D 1/00
416/176
(Continued)

FOREIGN PATENT DOCUMENTS

CN 103291561 A * 9/2013

OTHER PUBLICATIONS

Donahue, M.Z., "Can We Capture Energy From a Hurricane?" Smithsonian.com, Future of Energy, Oct. 12, 2016, [online, webpage, retrieved on Oct. 17, 2016] from: http://smithsonianmag.com/innovation/can-we-capture-energy-hurricane-180960750/?noist, pp. 1-3.

*Primary Examiner* — Julio C. Gonzalez
(74) *Attorney, Agent, or Firm* — Saliwanchik Lloyd & Eisenschenk (57) ABSTRACT

The current invention provides apparatuses and methods for protecting buildings/structures from wind damage and simultaneously harvesting energy from wind. The apparatuses of the current invention comprise horizontal axial wind turbines integrated to the roof-edge of the buildings/structures in an aerodynamically conducive and structurally viable configuration to reduce roof suction. The apparatuses of the current invention can further comprise aerodynamic roof gutter and structural supports/connections to alleviate wind-induced suction (negative pressures) on building roofs generated by separated flows and vortices. The apparatuses of the current invention can also comprise vertical axial wind turbines integrated to the wall-edge of the structures/buildings in an aerodynamically conducive and structurally viable configuration to reduce wind induced wall suction generated by separated flows and vortices.

14 Claims, 7 Drawing Sheets

(51) Int. Cl.
  *F03D 3/06* (2006.01)
  *F03D 13/20* (2016.01)
  *F03D 9/25* (2016.01)

(52) U.S. Cl.
  CPC ...... *F03D 13/20* (2016.05); *F05B 2240/9112* (2013.01); *Y02B 10/30* (2013.01); *Y02E 10/728* (2013.01); *Y02E 10/74* (2013.01)

(58) Field of Classification Search
  USPC .............. 290/44, 55; 415/4.3, 908, 4.2, 2.1; 416/155; 52/84, 94, 173.3
  See application file for complete search history.

(56) References Cited

U.S. PATENT DOCUMENTS

| | | | | |
|---|---|---|---|---|
| 4,236,866 A * | 12/1980 | Zapata Martinez | ...... | F03D 3/02 415/2.1 |
| 6,097,104 A * | 8/2000 | Russell | ................... | F03D 9/008 290/1 R |
| 7,315,093 B2 * | 1/2008 | Graham, Sr. | ........... | F03D 3/002 290/44 |
| 7,744,338 B2 * | 6/2010 | DeRuyter | ............. | F03D 3/0454 415/2.1 |
| 8,251,662 B2 * | 8/2012 | Parker | ................... | F03D 1/0633 416/176 |
| 8,393,853 B2 * | 3/2013 | Sauer | ..................... | F03B 13/264 415/72 |
| 9,243,611 B2 * | 1/2016 | Song | ....................... | F03D 3/061 |
| 2002/0040555 A1 * | 4/2002 | Banks | ..................... | E04D 13/00 52/90.1 |
| 2004/0061337 A1 * | 4/2004 | Becker | ..................... | F03D 3/002 290/44 |
| 2006/0152012 A1 * | 7/2006 | Wiegel | ..................... | F03D 3/002 290/55 |
| 2007/0018462 A1 * | 1/2007 | Richards | ................. | F03D 3/002 290/55 |
| 2007/0029807 A1 * | 2/2007 | Kass | ....................... | F03D 3/065 290/55 |
| 2008/0191487 A1 * | 8/2008 | Morgan | .................. | F03D 3/005 290/55 |
| 2009/0167025 A1 * | 7/2009 | Graham, Sr. | ........... | F03D 3/002 290/55 |
| 2010/0133820 A1 * | 6/2010 | Tsao | .......................... | F03D 3/00 290/44 |
| 2011/0215586 A1 * | 9/2011 | Grace | ...................... | E04H 9/14 290/55 |
| 2012/0161447 A1 * | 6/2012 | Seifert | .................... | F03D 3/002 290/55 |
| 2012/0261926 A1 * | 10/2012 | Van Den Bulcke | ...... | F03D 1/02 290/55 |

* cited by examiner

POWER GENERATION SCENARIOS

ACTIVE AERODYNAMICS MITIGATION AND POWER PRODUCTION SYSTEM FOR BUILDINGS AND OTHER STRUCTURES

CROSS-REFERENCE TO A RELATED APPLICATION

This application claims the benefit of U.S. Provisional Application Ser. No. 62/004,434, filed May 29, 2014, the disclosure of which is hereby incorporated by reference in its entirety, including all figures, tables and drawings.

BACKGROUND OF INVENTION

Reducing wind induced damage and water intrusion to structures is a high priority in the field of building design and construction. Post-disaster surveys have provided direct evidence that wind-induced damage and property losses are due largely to failure of building envelope components (e.g., roof components and wall cladding failures, soffit failures) causing water intrusion and building interior damage. These failures are often initiated at wind edges, such as, for example, roof edges, corners, and wall edges and corners subjected to suction forces caused by high winds.

Windstorms also pose severe threats to building operations due to power outages resulting from damage. Hurricane related power outages are a growing concern, as they cause severe disruption of activities and operations in residential/commercial/industrial buildings, hospitals, and emergency shelters.

Devices and methods for reducing wind damage require careful consideration in new construction projects, as well as when retro-fitting existing buildings and structures in windstorm-prone regions. Current aerodynamics mitigation devices typically operate passively by blocking or redirecting winds away from or in a direction that is less damaging to a building or structure. However, the potential power generated by strong winds can be significant. Thus, while current devices can be effective in inhibiting wind damage by redirecting the wind, they offer no opportunity to actually harvest the potential energy from wind.

A wind mitigation system that protects against the physical effects of wind and also utilizes potential wind power to create energy reserves for immediate and/or later use, such as to allow sustainable operations and/or provide power under emergency conditions, would be a significant improvement in building design and construction.

BRIEF SUMMARY

The embodiments of the subject invention provides a significant improvement in the building and construction industry and is applicable to new and existing buildings and structures that are vulnerable to windstorms such as hurricanes, tornados, microbursts, and thunderstorms. The embodiments of the subject invention provide apparatuses and methods that can facilitate a paradigm shift in wind damage mitigation by attenuating wind impact and reducing suction forces, while simultaneously benefiting from wind energy.

Specifically, the subject invention provides apparatuses and methods for inhibiting wind-damage to structures. These apparatuses and methods can simultaneously harvest the potential energy generated by winds. Thus, the embodiments of the subject invention can protect physical structures while simultaneously aiding in making those same structures energy self-sufficient.

The devices of the subject invention also provide the advantages of being efficient, able to operate under normal wind conditions, causing no adverse effects to wildlife, and capable of being incorporated into existing as well as new structures. Advantageously, structures incorporating the devices of the subject invention can be hazard-resilient and energy self-sufficient to promote climate-ready and sustainable living.

The aerodynamic viability, structural and economic feasibility, constructability, and performance of the subject system have been validated through detailed numerical and experimental investigations. For example, Computational Fluid Dynamics (CFD) modeling has been performed, which showed that systems of the subject invention can be very effective in reducing suction forces created by high wind. A prototype tested with a scaled building model showed that embodiments of the subject invention can significantly reduce wind-induced suction forces.

Devices of the subject invention can be incorporated into an aerodynamically conducive integrated system having small axial wind turbines, an aerodynamic roof gutter, and structural supports/connections to alleviate flow separation and vortex-related wind suction on building roofs and walls. In preferred embodiments, the system (1) mitigates the effects of turbulent wind induced vortices and flow separation related flow features to reduce the magnitude of suction, (2) harvests wind energy in high wind events and also from normal environmental winds, and/or (3) effectively drains roof rainwater runoff. Embodiments of the horizontal axial wind turbine can be integrated onto a roof-edge (without a gutter) in an aerodynamically conducive and structurally viable configuration to reduce roof suction and to harvest energy from diverted wind. A Venturi effect can be simulated to accelerate the wind-stream to tap-off maximum energy while reducing wind induced suction. The system can also employ an aerodynamically conducive design for a vertical axis turbine with wind load suppression features, which can be integrated into wall edges/corners of a building to reduce wind induced wall suction generated by separated flows and vortices. The system can be installed about any other axis as well, based on the configuration of the structure to which it is to be attached.

Design configurations of the subject invention can generate "green energy" that can be stored in batteries and converted as needed from DC to AC power by inverters strategically located based on the building configuration. In another configuration, the harvested green energy can be used through net metering (i.e., electric energy generated by an electric consumer from an eligible on-site generating facility and delivered to the local distribution facilities to be used to offset electric energy provided by the electric utility to the electric consumer during the applicable billing period.) This can reduce or eliminate the costs of battery storage.

The multi-functional Active Aerodynamics Mitigation & Power Production System of the subject invention is cost-effective (low pay back period), light, durable, quiet, and aesthetically appealing and is applicable to new construction as well as for retrofitting of existing buildings and other structures. By significantly enhancing environmental and infrastructure sustainability and development of wind-resistant communities, contributing to reduced risk to life and property/infrastructure, the subject invention can have global applications in wind-prone regions worldwide.

BRIEF DESCRIPTION OF DRAWINGS

In order that a more precise understanding of the above recited invention can be obtained, a more particular description of the invention briefly described above will be rendered by reference to specific embodiments thereof that are illustrated in the appended drawings. The drawings presented herein may not be drawn to scale and any reference to dimensions in the drawings or the following description is specific to the embodiments disclosed. Any variations of these dimensions that will allow the subject invention to function for its intended purpose are considered to be within the scope of the subject invention. Thus, understanding that these drawings depict only typical embodiments of the invention and are not therefore to be considered as limiting in scope, the invention will be described and explained with additional specificity and detail through the use of the accompanying drawings in which.

DETAILED DISCLOSURE

The subject invention provides devices and methods for reducing magnitude of suction forces on a structure generated by passage of high winds over a structure surface. More specifically, the subject invention provides wind turbines, or similar such devices, capable of mitigating wind forces on building roofs and wall edges and corners, particularly at "hot spots," (e.g., wind edges such as corners, eaves, ridges, gable ends, wall edges/corners). Additional embodiments can incorporate the turbines into a system for capturing and storing the energy of the wind as it passes the turbines.

The subject invention is particularly useful in the field of building construction, in particular buildings subject to significant high wind events. However, a person with skill in the art will be able to recognize numerous other uses that would be applicable to the devices and methods of the subject invention. While the subject application describes, and many of the terms herein relate to, a use for reducing wind-induced structural damage, other modifications apparent to a person with skill in the art and having benefit of the subject disclosure are to be within the scope of the present invention.

In the description that follows, a number of terms are used related to building construction. In order to provide a clear and consistent understanding of the specification and claims, including the scope to be given such terms, the following definitions are provided.

As used herein, the term "structure" is used to refer to any type of building or infrastructure, constructed object, or form susceptible to wind forces across the roof or the walls, or other surfaces. This can include, but is not limited to, sheds, barns, single- or multi-family homes, office buildings, commercial buildings, industrial buildings, malls, stadiums, signs, canopies, trusses, towers, structures related to or used for transportation or traffic (including bridges), or energy- or power-related infrastructures. This term is also not limited to any particular roof or wall material, construction technique, or style and can include roofs or walls that are situated at any angle, flat, tiered, sloped, or otherwise configured.

Also, as used herein, and unless otherwise specifically stated, the terms "operable communication," "operable connection," "operably connected," "cooperatively engaged" and grammatical variations thereof mean that the particular elements are connected in such a way that they cooperate to achieve their intended function or functions. The "connection" or "engagement" may be direct, or indirect, physical or remote.

The present invention is more particularly described in the following examples that are intended to be illustrative only since numerous modifications and variations therein will be apparent to those skilled in the art. As used in the specification and in the claims, the singular for "a," "an" and "the" include plural referents unless the context clearly dictates otherwise.

Reference will be made to the attached Figures on which the same reference numerals are used throughout to indicate the same or similar components. With reference to the attached Figures, which show certain embodiments of the subject invention, it can be seen that the embodiments of subject invention comprise a wind aerodynamics mitigation system that incorporates an active blade system 50 comprising one or more turbines 100 that can be attached to a structure, horizontally, vertically, or any other direction. A connecting system 200 can be used to attach one or more turbines to a structure to create an active blade system. The active blade system of one or more turbines can be operably connected to an energy generating and storage system 400.

Figure 1:
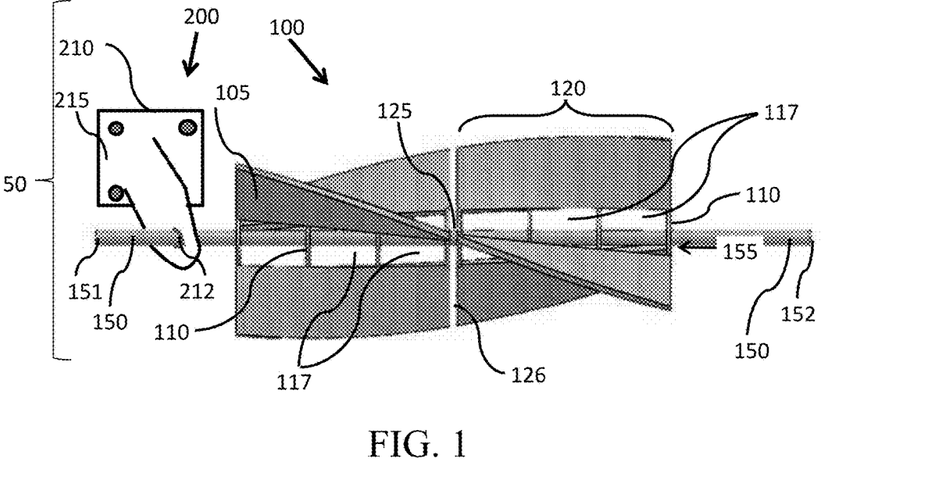
FIG. 1 is a front view of an active blade system of the subject invention.
Figure 2:
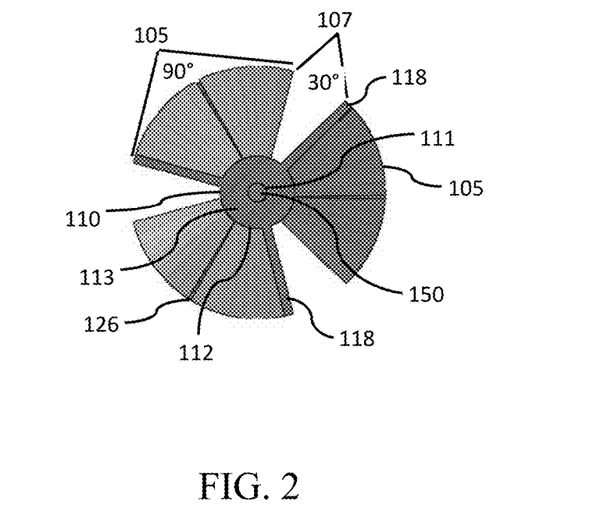
FIG. 2 is a side view of an active blade system of the subject invention.

With reference to FIGS. 1 and 2, the turbines of one embodiment of an active blade system of the subject invention comprise one or more blades 105 attached around a central shaft 150 having a first end 151 and a second end 152. A blade can have any of a multitude of configurations known in the art, such as, for example, circular, tubular, flat, bent, curved, or combinations thereof. The blade configuration will, ideally, allow a turbine to rotate in high or low wind conditions. In one embodiment, a blade is in the form of a helical structure where the central shaft is positioned at the axis 155 of the helix, which turns or spins around the central shaft. Stated otherwise, the shaft is parallel with or collinear with the axis of the helix.

A helical form blade has several advantages over other types of blades. They tend to be quieter in operation, due to reduced wind speed along their tips. Spinning can be initiated under lower wind conditions and the blades can also withstand higher wind conditions than most other blade designs. A helical blade configuration can also provide for a lower profile system, since the blades can operate effectively when close to the central shaft. However, it will be understood by a person skilled in the art that other blade configurations can also be used with the embodiments of the subject invention.

Figure 3:
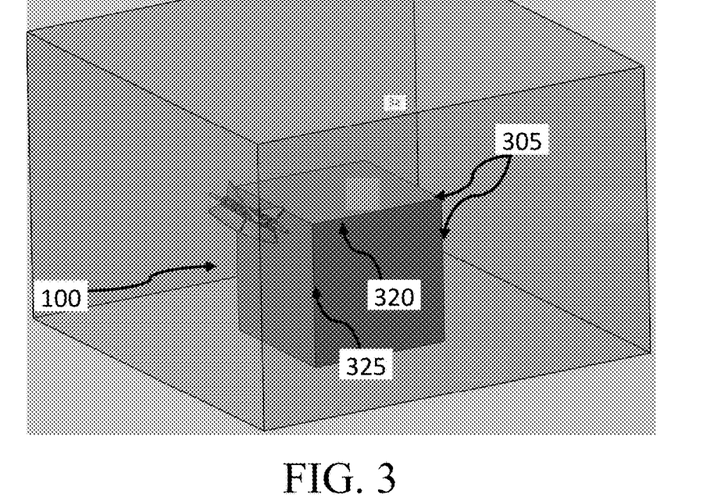
FIG. 3 is a simplified representation of structure to illustrate one area for placement of an active blade system of the subject invention.

FIG. 3 illustrates an example of a turbine attached to a structure, illustrating how it can follow the roof line of the structure, presenting a lower profile than other types of blade designs. The turbine could also be attached at any other position on a structure conducive to reducing wind loads.

Figure 4:
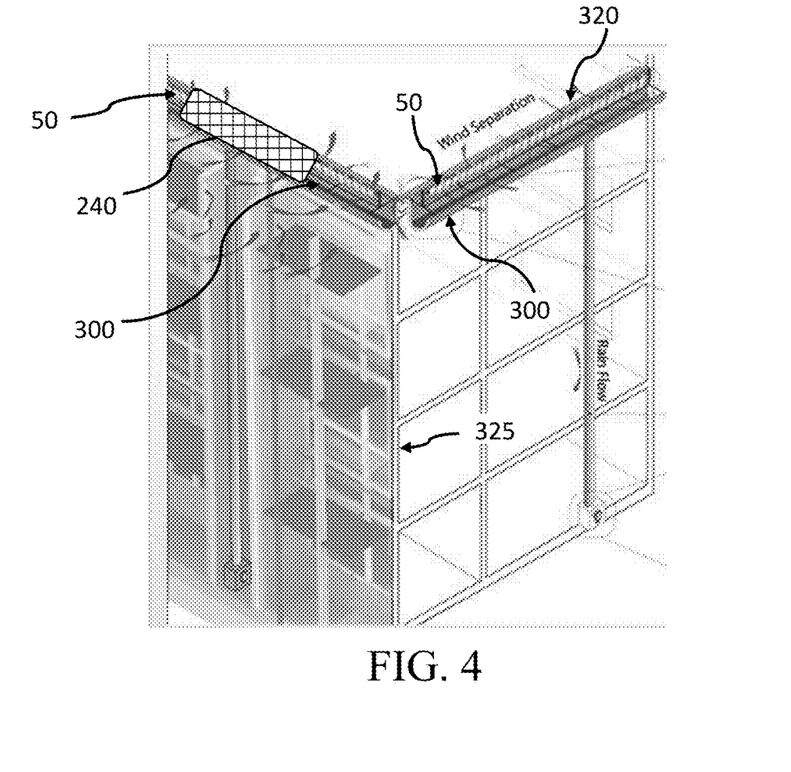
FIG. 4 illustrates a structure having an active blade system installed across an edge of the roof line.

FIG. 4 illustrates an entire active blade system attached to a building, again illustrating that the active blade system can present a lower profile, less noticeable appearance on a structure than some other blade designs.

In one embodiment, a turbine has at least one blade 105 attached to the central shaft 150. In a more particular embodiment, more than one blade is attached around the central shaft. In a specific embodiment, illustrated, for example, in FIGS. 1 and 2, there are three helical blades attached around the central shaft. Preferably, the blades are evenly spaced around the central shaft. However, this is not required and alternative embodiments can have multiple blades with variable spacing around the central shaft.

The turning radius or "pitch" of a helical blade on the central shaft can vary. The required turning radius can also depend upon the number of helical blades attached to a given shaft. Preferably, the number of blades and the turning radius of each blade are arranged to achieve the maximum efficiency or to obtain the maximum benefit of any wind currents. In one embodiment, efficiency is improved by having the number of blades and the turning radius thereof configured so any wind current passing within range of the blades contacts one or more blade surfaces.

The number of blades and the pitch thereof on each helical blade turbine can be configured to maximize the rotational ability of the turbine at lower wind speeds. FIG. 2 illustrates a particular embodiment having three helical blades arranged so that the pitch of each blade allows it to curve around approximately 90° on the central shaft 150. Thus, the pitch of the blade can be larger than the available length of the central shaft. In the specific embodiment, shown in FIGS. 1 and 2, three helical blades are arranged equidistant around a central shaft, each having a pitch that allows it to extend approximately 90° on the central shaft with a 30° gapped space 107 between each blade. Alternatively, the pitch can be significantly smaller such that at least one full turn of the helical blade can be achieved on a given central shaft. It should be understood that a person with skill in the art will be able to determine a preferred blade pitch and curvature angle on a given shaft.

Wind turbines can cause a negative impact on wildlife, particularly bird species. An advantage to helical blade forms is that they rarely cause harm to wildlife, and are usually bird-friendly. Their ability to operate effectively with a lower profile gives them a smaller target area for birds to encounter and the helical design tends to push birds out of the way more effectively than horizontal axis blades, which, when spinning, have a knife-like operation. Helical blades can also operate without being directed in an optimal direction and are also not negatively affected by crosswinds. To further mitigate their impact on wildlife, the turbines of an active blade system can have a shield 240 to inhibit contact therewith. In one embodiment, a shield is screen or mesh material or apparatus that covers or surrounds the turbines, yet allows wind to pass through and does not interfere with the operation of the turbines. FIG. 3 shows a non-limiting example of a shield that could be used with embodiments of the subject invention.

Figure 6:
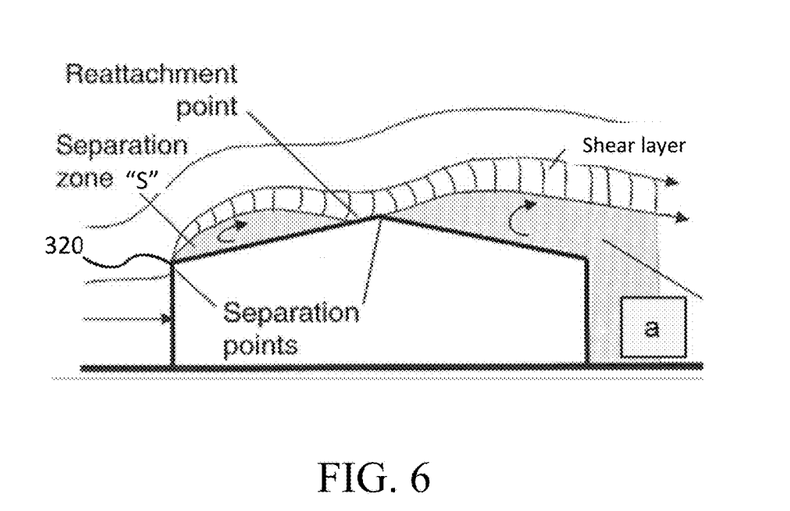
FIG. 6 is an illustration of the separation zone "S" created by wind separation and reattachment points on a sloped roof line. The space between the wind separation and wind reattachment points on a sloped (or flat) roof creates a negative pressure zone that causes roof structures to be lifted up, resulting in damage.
Figure 7:
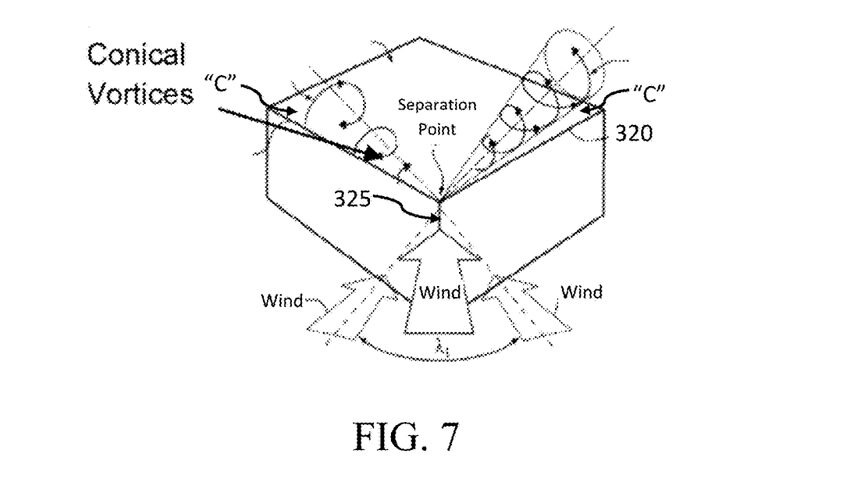
FIG. 7 is an illustration of the conical vortices formed across a roof caused by diagonal winds. As the vortices form over a roof structure, as seen here, it forms negative pressure zones "C" along the edges of the structure that tend to lift up roof components, resulting in damage.

Wind uplift on a roof structure or suction-forces on a wall are typically caused when wind encounters the wind edges 305, or the sharp horizontal edges 320 of a roof line or the vertical edges of building walls 325, which act like a knife blade separating the wind stream. FIG. 6 illustrates how the lower edge of an angled roof creates a separation zone "S" between the roof surface and the wind flow in which a reduced pressure (or "suction") is created. The suction created on the roof surface can be strong enough to lift the roof components sufficiently and blow them away. The wind can also penetrate beneath the structures and cause damage through domino effects, followed by water intrusion. FIG. 7 illustrates a similar effect on a flat roof structure. In this figure, it can be seen how the sharp vertical wall edges 325 of a structure combined with the sharp horizontal edges 320 of a flat roof line can create conical vortices of increased wind speeds across the roof surface. The conical vortices also create low pressure (suction) zones "C" along the roof edges where tiles, pavers, and other roof structures can be lifted sufficiently with enough force to blow material(s) off the roof. The wind can also penetrate beneath the structures and cause damage through domino effects, followed by water intrusion, as mentioned above.

The active blade system of the subject invention can disrupt the wind flow to inhibit or alleviate the wind-induced suction on a roof surface or walls due to flow separation and conical vortices. Preferably, an active blade system of the subject invention will be installed at, or in close proximity to, and parallel to the roof line, or other horizontal edges 320 and/or vertical edges 325, of a structure. These areas are referred to as wind edges. This can situate the blades at various locations with respect to the edge or corner to disrupt the flow and reduce the magnitude of wind-induced suction.

Figure 9:
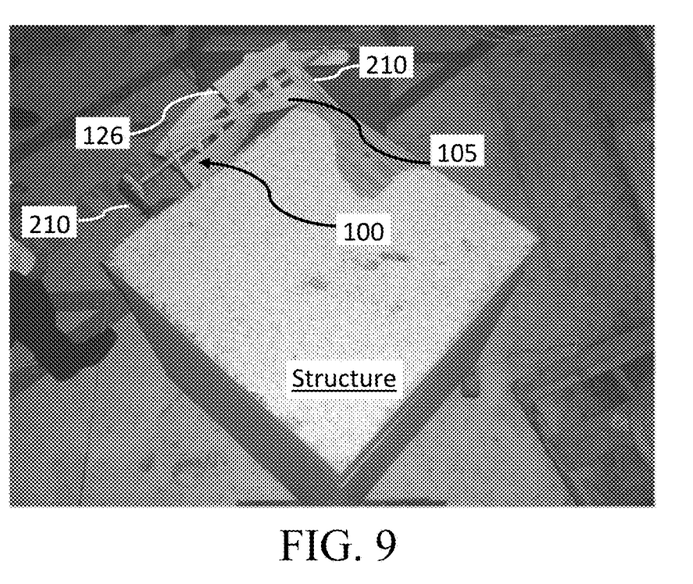
FIG. 9 is an example structure on which an active blade system has been installed. Loose gravel has been scattered on the roof of the structure and a wind stream was directed at the structure so that it would go through an active blade system installed thereon. It can be seen that on the edge without the active blade system, the gravel was scoured across an area of the roof, indicating the effect of wind-induced suction on the edge without the active blade system.
Figure 10:
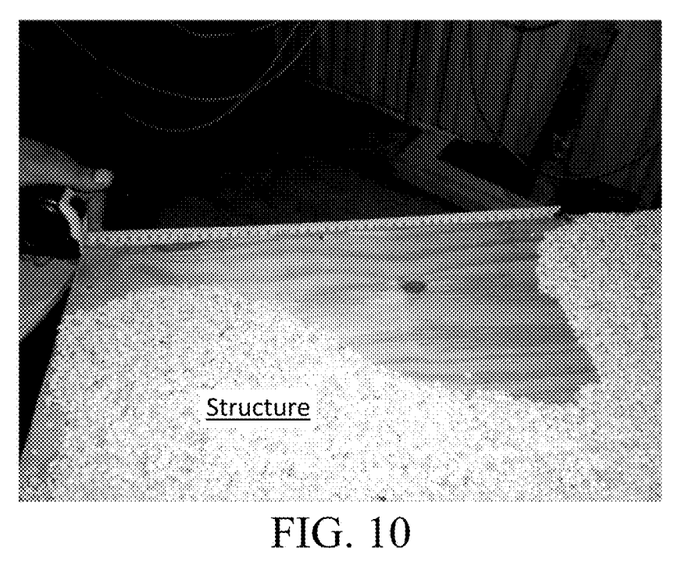
FIG. 10 is a closer view of the scoured roof area in FIG. 9 and shows that a significant amount of surface area experienced gravel scouring due to wind-induced suction.

FIG. 9 illustrates a test building with loose gravel on the roof surface on which an active blade system 100 of the subject invention is installed along one edge. The blades 105 rotate under wind force, disrupting the flow and significantly reducing the magnitude of wind-induced suction; this inhibits the gravel from being scoured away along the edge where the turbine is installed. FIG. 10 further illustrates that on the side without an active blade system installed, the gravel surface is scoured away over a relatively large area due to wind-induced suction. During this particular experiment, the generated wind was directed towards the corner of the test building, so the incoming wind direction was identical for both the roof edges with and without the active blade system.

The mitigation of wind uplift across a roof can depend, at least partially, on the diameter of the helical active blade system with respect to the building configurations. The wind uplift generated on a roof is generally proportional to the square of the oncoming wind speed. However, a helical active blade system of the subject invention can be designed to take into consideration that a roof will experience low to very high winds. Accordingly, the diameter of any turbine 100 of an active blade system 50 will most often be determined based on the building configurations rather than the expected wind speeds.

The diameter of the turbines 100 of an active blade system 50 can depend upon several factors that would be understood by a person skilled in the art. For example, building configuration, including the height, horizontal plan, roof slope, geographical direction, and other factors can dictate the size, location, and arrangement of one or more active blade systems on a structure. Thus, for example the diameter of a turbine can be between approximately 4 inches to approximately 36 inches or more. It is possible for an active blade system to have a diameter smaller than 4 inches and greater than 36 inches, depending upon the structure dynamics and configuration. For example, a low-rise structure can have turbines with a diameter of 4 inches or more, whereas a high-rise structure can have turbines with a diameter of 36 inches or more. However, some areas of a structure could utilize turbines with a less than 4 inch diameter, while other areas or structures may benefit from turbines of greater than a 36 inch diameter. Thus, the embodiments of the subject invention are not limited to a specific turbine diameter.

The attachment of the blades 105 to the central shaft 150 can be direct or indirect, in that, the blades can extend directly from the central shaft, or they can be attached by various clips, rails, pins, interdigitating mechanisms and other devices and techniques known in the art. They can also be supported so that they are some distance away from the central shaft, such that there is a space between the blade and the central shaft. There can be advantages to all of these configurations.

In one embodiment, the blades 105 are attached to the central shaft by spaced supports 110 that attach between the first end 151 and the second end 152 to a blade and connect the blade to a central shaft. A support can assume any of a variety of configurations, but will, preferably, provide an attachment that allows the helical blades to turn, while simultaneously turning the central shaft. A support can be a fixed attachment between the blade and the central shaft. However, repairs, adjustments, replacement, or other modifications may be necessary to an active blade system. Transport and shipping can also be easier with smaller components, or components that can be disassembled and reassembled, particularly if they are designed to fit or be arranged in such a way as to minimize the amount of required space for storage. It can be advantageous for the blades, supports, central shaft, or other components to be separable. More specifically, it can be advantageous for blades to be modular, such that they are formed of more than one section, where individual sections can be installed on or attached to a central shaft. Additionally, the central shaft can be modular and be either part of a blade section or independently modular on which blade sections can be installed.

FIGS. 1 and 2 illustrate an embodiment where the active blade system comprises blade sections 120 that can be installed along the length of a central shaft. In one embodiment, the blade sections can rotate independently on the central shaft. In another embodiment, the blade sections can be aligned, so that blades thereon can form single, elongated helical blades along the length of a central shaft. FIG. 1 illustrates a non-limiting example of two blade sections 120 aligned on a central shaft 150. The helical blades on each blade section can be aligned to form a contiguous helical blade turning about the central shaft. Any number of blade sections can be aligned on a central shaft.

As mentioned above, a central shaft can also be modular, such that blade sections can include one or more sections of connectable central shafts. A spacer 125 can be used between the individual blade sections to prevent wear and inhibit the blades from rubbing, bumping, or inhibiting each other during rotation. A spacer can ensure that there is a gap 126 between each blade section 120, so the individual blade sections do not make undesirable contact or cause wear on each other.

In a further embodiment, at least one support 110 connects a blade 105 to a central shaft. As will be discussed in more detail below, the ability of the central shaft to be turned by the action of the blades can be advantageous. Therefore, the support that connects the blade can form a fixed attachment between the blade and the central shaft, to transfer motion of the blade to the shaft.

In one embodiment, a support 110 is a washer-shaped form where a central shaft 150 can be disposed through a bore 111 therethrough and a blade 105 can be attached to the periphery 112 of the support body 113. A non-limiting example of a support embodiment is shown in FIG. 2. Utilizing a washer-shaped support can have several advantages. First, it provides structure to support a blade and can maintain a blade at a distance from the central shaft. This can create gaps or wind channels 117 between the supports, central shaft, and blade. The diameter of a support can vary, depending upon a variety of factors understood to those with skill in the art. Such factors can include, but are not limited to, the material(s) utilized for a support, the size of the blades, diameter of the central shaft, anticipated maximum wind speed likely to be encountered by an active blade system, the number of supports utilized on a blade, as well as aesthetic factors that can affect support design. Variations in the size, diameter, shape, or configuration of a support, which provide the same function, in substantially the same way, with substantially the same result are within the scope of this invention.

In a further embodiment, a support 110 can have one or more ribs 118 therefrom that extend out from the periphery 112 of the support body 113. The ribs can extend parallel to the surface of a blade and support the blade. They can be rigid supports against which the blades abut. Alternatively, the ribs can be attached to the blades. In a specific embodiment, a support having one or more ribs is located on each end of a modular blade section 120, so that the ribs extend along the side edges of a blade. In a further specific embodiment, the ribs are attached to at least a portion of the blade edge, so that the blade edge is supported by the rib. FIG. 2 illustrates an example of a support body 113 with ribs 118 to support the side edges of each blade on the blade section 120 to which the support is attached.

For an active blade system to operate, it can be beneficial for it to be securely affixed to a structure in a way that allows the blades and central shaft to turn and still provide a secure support. A connecting system 200 can be employed to attach one or more turbines to a structure. Such a connecting system could support the turbines of an active blade system from multiple points or angles, so that the system is not dislodged or inactivated during any wind speed or direction. A connecting system 200 can include one or more devices or mechanisms for attaching turbines to a structure, permanently or removably. Such attachments should be conducive for use with blade sections 120 and should also allow for easy repair of an active blade system, if necessary.

Figure 5:
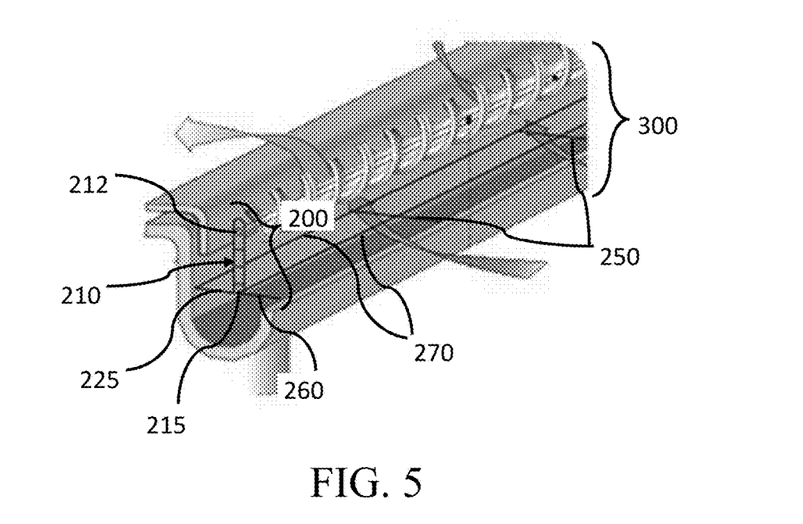
FIG. 5 is an enlarged view of a portion of the active blade system shown in FIG. 4.

In one embodiment, a connecting system 200 includes a plurality of brackets 210 used to support a central shaft 150. For example, one or more eye brackets could be used, such as those known to those with skill in the art. Typically, eye brackets have an opening or eye 212 at one end for receiving a rod or other object there through and at another end, or fixing end 215, some means for attaching the bracket to another object. FIGS. 1 and 5 show non-limiting examples of eye brackets that could be employed with the embodiments of the subject invention.

The eye 212 can be just a hole through the bracket. Alternatively, the eye can be created by a bale system that closes over an opening in the bracket, which allows the eye to be enlarged or have a temporary slot into which an object can be inserted therethrough, after which the bail can be closed to reform the eye. The opposite or fixing end 215 can include one or more bores to accommodate screws, bolts, nails, or the like therethrough, or can employ more elaborate connection mechanisms, such as, for example, clamps, snaps, clips, adhesive surfaces, magnets, and any of a variety of other attachment mechanisms. Alternatively, the fixing end can be fixedly attached, such as by welding, gluing, or otherwise permanently attaching the fixing end to a structure.

In one embodiment, the fixing end 215 of a bracket is attached to a structure and the central shaft is disposed within the eye of a bracket. Multiple brackets can be used along the length of a central shaft. Further, more than one type of bracket can be used. For example, the ends of the central shaft could be secured with one type of eye bracket and brackets used along the length of the central rod could be another type of bracket.

Structures are often fitted with a system of rain gutters. Coincidentally, the rain gutters are often located in the same location where it is desirable to place an active blade system of the subject invention. FIG. 4 illustrates an example of a building with a gutter system 300 along the upper roof line. The location of the gutter system on this structure, being along the lower roof line, is in the same location that an active blade system 50 of the subject invention would ideally be placed as well. On many structures, it may not be feasible or desirable to attach multiple brackets, or other components that can be part of a connecting system 200, which can damage the structure, interfere with a gutter system, or be unsightly.

In one embodiment, an active blade system of the subject invention is incorporated with the gutter system 300 on a structure. FIG. 5 illustrates a non-limiting example of such a system. With this embodiment, brackets can be attached to the gutter so that an active blade system can be arranged in parallel with the gutter system. Preferably, operation of the active blade system will not interfere with the operation of the gutter system, and vice versa. However, attachment of brackets directly to a gutter system can is not required and, in some situations, can adversely affect the operation of a gutter system or may not be feasible with some gutter systems. However, this could be a feasible option for some structures and other cases.

Figure 8:
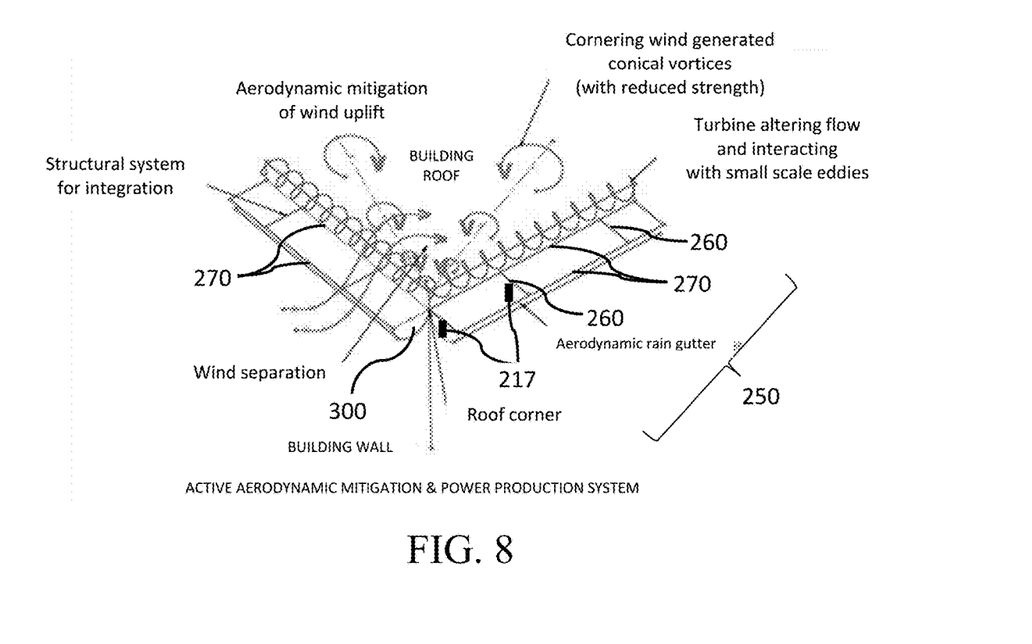
FIG. 8 is an illustration of how an active blade system of the subject invention can mitigate the effects of wind induced suction by modifying the interaction between the wind stream (and eddies) and the roof. Also shown in this figure is an example of how an active blade system of the subject invention can be integrated with a gutter system.

In one embodiment, a connecting system 200 can include a support frame 250 that can be operably connected or incorporated with a gutter system 300, to which an active blade system can be further operably connected. A support frame can include multiple points of attachment for brackets. Alternatively, a support frame can include pre-attached brackets 210 for receiving a central shaft 150. In one embodiment, a support frame has multiple cross-beams 260 fixed to attachment rods 270. The attachment rods can be removable or permanently attached to the walls of a gutter system, such that the cross-beams go over the gutter channel or are perpendicular to the gutter walls, an example of which is shown in FIG. 5. At least one bracket 210 can be affixed to the cross-beams for receiving the central shaft of an active blade system. While the at least one bracket can be of any operable configuration, as discussed above, it can be most advantageous for the brackets to position the central shaft 150 to be horizontally aligned with the roof edge. This can likewise situate the blades on either side of the roof line, or other edge of the structure, maximizing their ability to affect wind flow. FIGS. 5 and 8 illustrate examples of a support frame, where FIG. 5 specifically shows a bracket 210 affixed to a cross-beam.

A support frame 250 can have any of a variety of alternative configurations as well. For example, individual cross-beams can be fixed to a gutter system. One or more lower supports 217 can be included to hold the support system off the floor of a gutter. Other modifications can also be utilized, as may be required for particular structures and/or their installed gutter systems. It is within the skill of a person trained in the art to determine an appropriate support system, or modifications thereof, which would be suitable for use with an active blade system embodiment of the subject invention. Such a support system can attach a turbine system along a roof line or any other horizontal or vertical line or axis of a structure. Any such alternatives, which provide the same function with substantially the same results, are within the scope of this invention.

The ability of the active blade system 50 of the subject invention to provide a substantially constantly rotating mechanism, in the central shaft 150, provides the potential for generation of electrical energy. There are many possible power generation scenarios that can be utilized with a wind-driven central shaft to produce electrical energy. Likewise, there are a myriad of devices and methods that can be used to convert and store DC and AC electricity. The electrical generating opportunities provided by the active blade system of the subject invention are understood by a person with knowledge and understanding in the art. Accordingly, such variations are within the scope of the subject invention.

In one embodiment, an active blade system 50 of the subject invention is utilized as part of a wind turbine system for generating electricity. Wind turbines and their operation are known to those with skill in the art. Typically, wind turbine systems can employ a stator and rotator system to create a changing magnetic field that can generate electricity. Other wind turbine devices and configurations capable of utilizing and converting wind-driven motion to electrical power are known to those with skill in the art. Ideally, a wind turbine system can utilize an active blade system of the subject invention and can be integrated with the structure of a building.

Figures 11A, 11B, 11C:
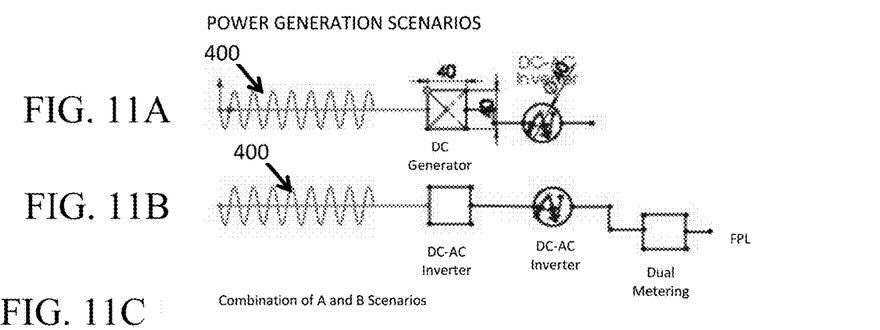
FIGS. 11A, 11B, 11C, and 11D show examples of power generation scenarios that can be incorporated with embodiments of the active blade system of the subject invention.
Figure 11D:
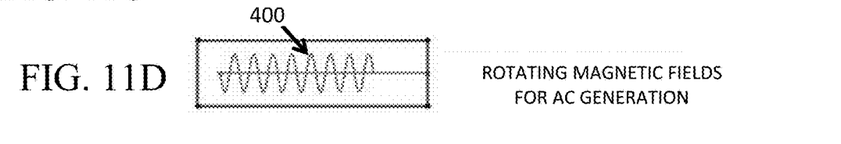

FIGS. 11A, 11B, 11C, and 11D illustrate examples of possible methods for the generation of electrical power utilizing one or more active blade systems of the subject invention. FIGS. 11A, 11B, and 11C illustrate embodiments that utilize an inverter to convert DC power to AC power. FIG. 11D illustrates an embodiment that employs a stator that produces a magnetic field, such as by incorporating a magnetic material to directly generate AC power in coils or structures incorporated with the rotor. Alternatively, the rotor can produce a magnetic field and the stator can incorporate a coil or other structure. In specific embodiments, magnets can be present on both rotor and stator. An AC current will be generated when the rotor rotates with respect to the stator. Other methods and devices that utilize a magnetic field to generate DC power can also be utilized in accordance with the embodiments of the subject invention.

The electrical energy generated by a turbine system can be stored on site with the use of batteries. Alternatively, the generated energy can be delivered to local receiving facilities for distribution or storage. Combinations of these systems can also be employed.

Figure 12:
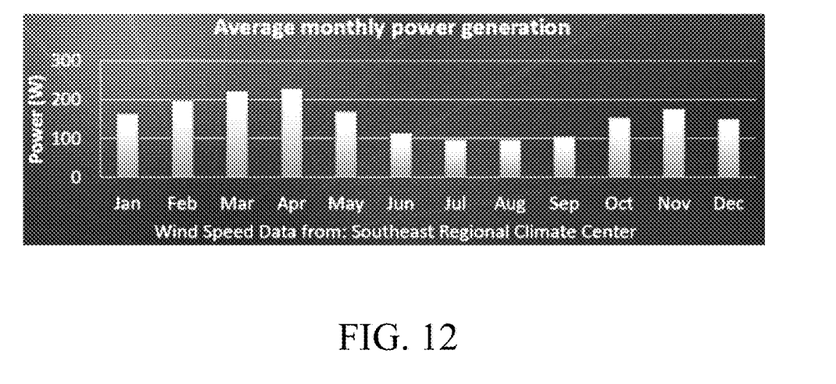
FIG. 12 is a graph showing the average potential power generation that could be obtained given the predicted wind speeds per month.

The energy production by any given electrical power generating system operably connected to an active blade system of the subject invention can depend upon several factors, including the amount and speed of wind passing through the active blade system. FIG. 12 is a graph that illustrates the average monthly power generation that could be obtained by harnessing the potential energy of the wind. The active blade system of the subject invention, utilized with an efficient electricity generating and storage system, could provide sufficient energy to maintain at least the critical electrical functions of a given structure.

Figure 13:
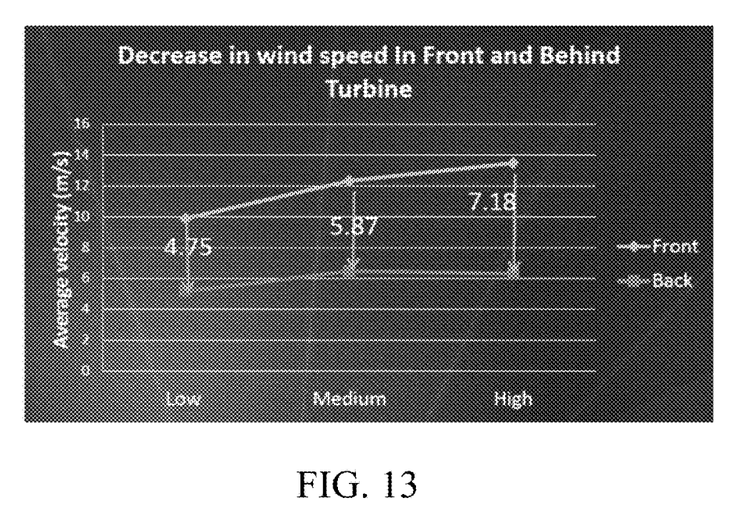
FIG. 13 is a graph that illustrates the average decrease in wind velocity effected by an active blade system of the subject invention.
Figure 14:
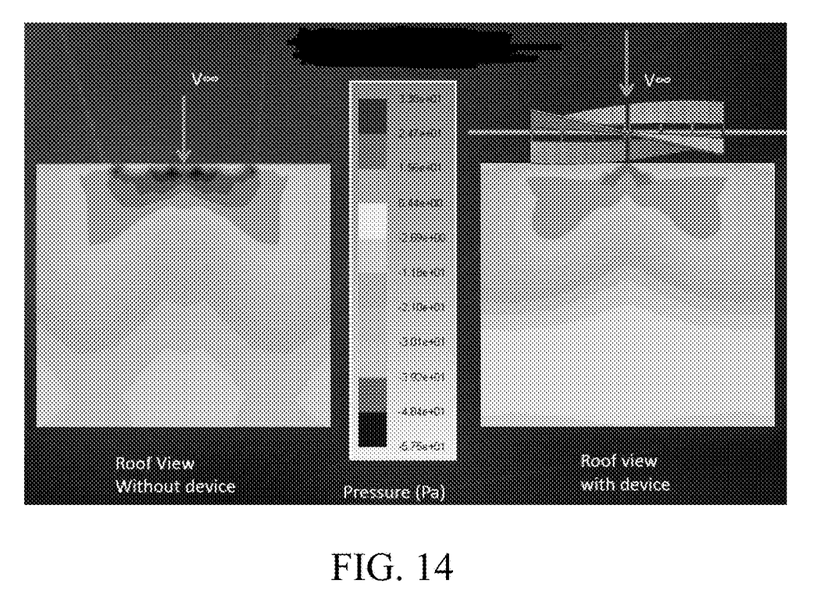
FIG. 14 illustrates the results of a Computation Fluid Dynamics (CFD) simulation. The left side shows the amount of pressure generated on a roof without an active blade system. The right side shows how the magnitude of the suction or negative pressure is reduced on the same roof with an active blade system installed.

The graph of FIG. 13 demonstrates how effectively the active blade system of the subject invention operates to decrease wind speed across the roof of a structure. It can be seen that even at high incoming wind speeds, the average wind velocity is decreased significantly. FIG. 14 provides a further illustration of the effectiveness of an active blade system of the subject invention. In this image, the change in pressure across a roof with and without an active blade system is shown. The roof surface shown on the left side indicates darker areas near the wind edge that indicate undesirable negative pressures (suction) for separation zones "C." The roof shown on the right side has an example active blade system installed along or in close proximity to the wind edge 320 of the structure. As seen in this image, the darker regions that appear on the left side roof are not generated on the same edge with an active blade system installed. This indicates that the active blade system interferes sufficiently with the wind stream to reduce the magnitude of suction which can also reduce the risk of damage to the roof.

The active blade system of the subject invention provides a significant improvement over current wind mitigation techniques. When combined with a power generation system, the embodiments of the subject invention can provide a structure that is not only better protected in adverse wind conditions, but is also capable of being self-sufficient when primary power-generation is unavailable.

All patents, patent applications, provisional applications, and other publications referred to or cited herein are incorporated by reference in their entirety, including all figures and tables, to the extent they are not inconsistent with the explicit teachings of this specification. Additionally, the entire contents of the references cited within the references cited herein are also entirely incorporated by reference.

The examples (including all figures and tables) and embodiments described herein are for illustrative purposes only and that various modifications or changes in light thereof will be suggested to persons skilled in the art and are to be included within the spirit and purview of this application.

Any reference in this specification to "one embodiment," "an embodiment," "example embodiment," "further embodiment," "alternative embodiment," etc., is for literary convenience. The implication is that any particular feature, structure, or characteristic described in connection with such an embodiment is included in at least one embodiment of the invention. The appearance of such phrases in various places in the specification does not necessarily refer to the same embodiment. Further, when a particular feature, structure, or characteristic is described in connection with any embodiment, it is within the purview of one skilled in the art to affect such feature, structure, or characteristic in connection with other ones of the embodiments.

The invention has been described herein in considerable detail, in order to comply with the Patent Statutes and to provide those skilled in the art with information needed to apply the novel principles, and to construct and use such specialized components as are required. However, the invention can be carried out by specifically different equipment and devices, and various modifications, both as to equipment details and operating procedures can be effected without departing from the scope of the invention itself. Further, although the present invention has been described with reference to specific details of certain embodiments thereof and by examples disclosed herein, it is not intended that such details should be regarded as limitations upon the scope of the invention except as and to the extent that they are included in the accompanying claims.

We claim:

1. An aerodynamics mitigation system comprising:
   at least one turbine, adapted to attach to a structure, comprising,
      a shaft having a first end and a second end, where the shaft is maintained parallel with a wind edge of the structure;
      a connecting system that rotatable attaches the first end and the second end of the shaft to the structure;
      at least one helical blade attached to the shaft by at least one support, such that there is a channel between the helical blade and the shaft, the helical blade being rotatable with the shaft and positioned at or in proximity to the wind edge, to reduce wind-induced suction on the structure by disrupting
         wind flow across the wind edge, thereby alleviating the formation of at least one of a separation zone and conical vortice.

2. The system, according to claim 1, comprising at least two turbines wherein the blades on the at least two turbines are aligned to form a continuous helical blade around the shafts of the at least two turbines.

3. The system, according to claim 1, further comprising a support frame, wherein the support frame is incorporated into a gutter system on the structure and the connecting system is incorporated with the support frame.

4. The system, according to claim 1, further comprising an energy generating and storage system operably connected to the shaft.

5. The system, according to claim 4, wherein the energy generating and storage system utilizes the rotation of the shaft to produce electrical energy.

6. The system, according to claim 4, wherein the energy generated is stored in one or more batteries.

7. The system, according to claim 1, wherein the at least one blade is removably attached to the shaft.

8. The system, according to claim 1, wherein rotation of the turbine alleviates, by aerodynamic mitigation of wind, at least one of a separation zone and conical vortice, thereby reducing wind load on at least one of a horizontal and vertical surface of the structure.

9. The system, according to claim 8, further comprising a shield that at least partially covers the blade to inhibit contact with the blade.

10. The system, according to claim 9, wherein the shield comprises a screen apparatus that at least partially surrounds the at least one blade and allows wind to pass therethrough.

11. The system, according to claim 1, wherein the pitch of the at least one helical blade is approximately 90°, relative to the shaft.

12. The system, according to claim 11, wherein the pitch of the at least one helical blade creates a 30° gap between the at least one helical blade and at least one other helical blade on the shaft.

13. A method for aerodynamically mitigating wind effects on the surface of a structure by utilizing a blade system comprising:
at least one turbine, wherein each turbine comprises,
a shaft having a first end and a second end,
at least one helical blade attached to the shaft,
a connecting system for attaching the shaft to a structure, such that the at least one turbine is maintained parallel with a wind edge of the structure with the at least one blade at or in proximity to the wind edge and is rotated by wind that is incident on the wind edge of the structure;
wherein the method comprises;
affixing the connecting system to the structure;
attaching the first end of the shaft and the second end of the shaft of the at least one turbine to the connecting system, so that the shaft is maintained parallel with the wind edge and the at least one blade is at the wind edge of the structure; and
allowing the at least one blade to rotate relative to the connecting system to disrupt the wind across the wind edge and alleviate at least one of a separation zone and conical vortice, whereby wind-induced suction is reduced on vertical or horizontal surfaces of the structure.

14. An aerodynamics mitigation system comprising:
at least one turbine comprising,
a shaft having a first end and a second end, where the shaft is maintained parallel with a wind edge of a structure;
at least one helical blade, with an axis configured around the shaft that is rotated by wind that is incident on the structure;
at least one support that attaches the helical blade to the shaft, such that there is a channel between the blade and the shaft; and
a connecting system comprising at least two brackets adapted to attach the first end and the second end of the shaft to the structure so that the at least one helical blade is at or in proximity to the wind edge, whereby the position and rotation of the at least one helical blade causes a disruption in a wind stream across the wind edge, to alleviate at least one of a separation zone and a conical vortice on a surface of the structure.

* * * * *